W. L. FAY.
DIAMETER STOP FOR LATHES.
APPLICATION FILED MAY 15, 1915.
1,154,107.
Patented Sept. 21, 1915.
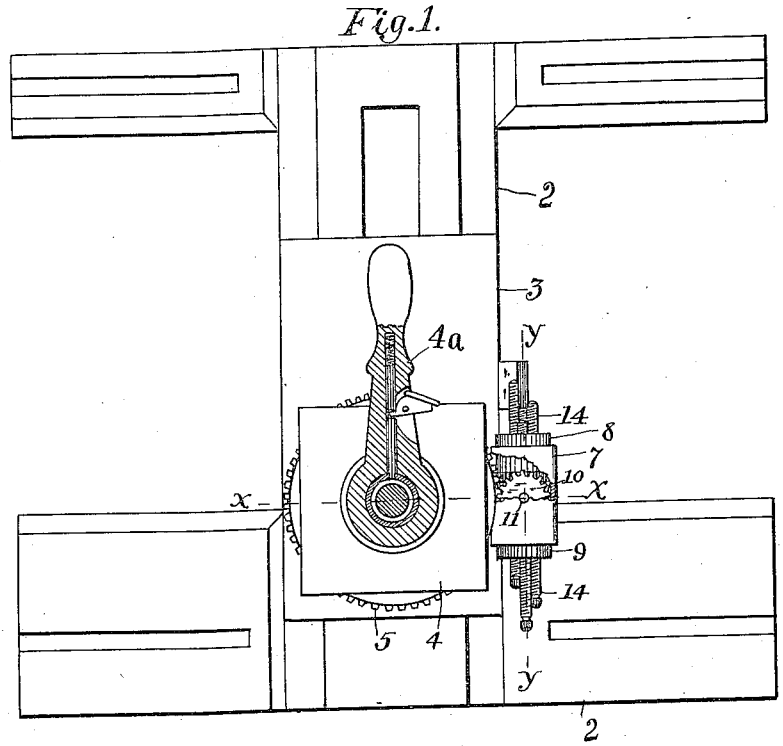
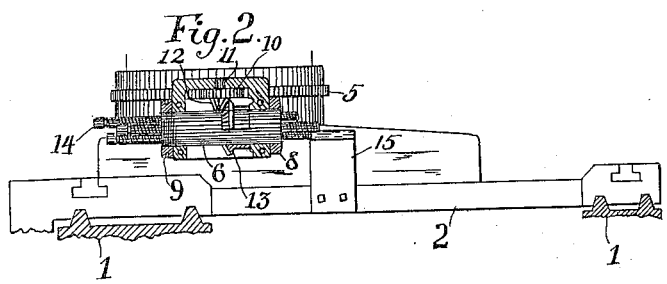
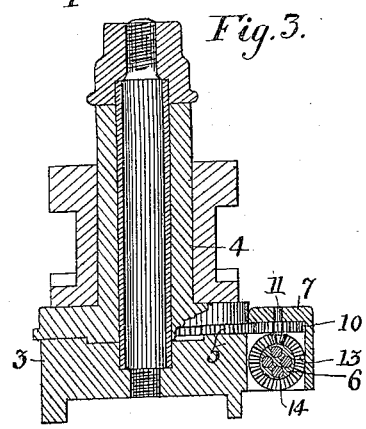
Inventor:
Winthrop Lincoln Fay
by S. W. Bates
Atty.

UNITED STATES PATENT OFFICE.

WINTHROP LINCOLN FAY, OF DEXTER, MAINE.

DIAMETER-STOP FOR LATHES.

1,154,107.  Specification of Letters Patent.  Patented Sept. 21, 1915.

Application filed May 15, 1915. Serial No. 28,457.

*To all whom it may concern:*

Be it known that I, WINTHROP LINCOLN FAY, of Dexter, in the county of Penobscot and State of Maine, have invented certain new and useful Improvements in Diameter-Stops for Lathes, of which the following is a specification.

My invention relates to turret lathes and other forms of lathes on which turrets are used and it relates particularly to the application to a turret of automatic diameter stops whereby cylindrical surfaces of varying diameters may be turned on the same piece, each diameter being provided with a gage which automatically stops the tool when the proper diameter has been reached.

The invention consists of the combination of parts hereinafter described and claimed whereby automatic diameter stops may be applied to lathe turrets in a simple and effective manner.

My invention may best be understood by means of the accompanying drawing in which is shown a lathe turret and its adjacent parts constructed in accordance with a lathe turret shown and described in a copending application No. 22,249 filed April 19, 1915, with my automatic stops applied.

In the drawing, Figure 1 is a plan of the carriage, slide and turret with certain parts shown in section, Fig. 2 is a section on the line *y y* of Fig. 1 and Fig. 3 is a section on the line *x x* of Fig. 1.

In the drawing similar figures of reference indicate similar parts.

Referring to the drawing, 1 represents the lathe bed, 2 is the carriage 3 is the slide and 4 is the turret. The turret is turned by a handle 4ª through the means of certain ratchet mechanism described in my copending application and not necessary to the present description. The turret has at its lower portion surrounding its base a gear which as here shown consists of a series of gear teeth 5 cut on the body of the turret and made integral therewith.

The stop screws are carried by a cylindrical member which is connected to turn with the turret automatically presenting the proper stop screw to correspond with each of the tool holding faces of the turret. As here shown, a stop cylinder 6 is journaled in a casing 7 which extends out from the slide adjacent to the base of the turret. The stop cylinder is held in place by a collar 8 on one end and by a nut 9 on the other end, both the nut and the collar bearing against the outer faces of the casing 7.

Motion is transmitted from the turret to the stop cylinder by means of a pinion 10 which is journaled in the casing 7 above the stop cylinder, this pinion being formed and positioned to engage the gear teeth 5 on the base of the turret. The pinion is journaled to the casing by means of a stud 11 and on the under side of the pinion is a bevel gear 12 which engages an annular bevel gear 13 surrounding the cylinder 6. Thus the rotation of the turret is transmitted through the gears 10, 12 and 13 to the stop cylinder.

Stop screws 14 are carried in screw threaded openings in the stop cylinder and as many screws are provided as there are faces in the turret, in the present instance, four.

A stop 15 is secured to the carriage at some suitable point and this stop is positioned so that it can contact with but one of the stop screws 14 at one time.

The relation of the several gears is such that the turret and the stop cylinder make one complete revolution at the same time. Thus, as the tool in each face of the turret comes into position to turn a cylindrical portion on the work, the corresponding stop screw will be in position to strike the stop 15.

The manner of using my automatic stop will be obvious to any machinist from what has been said about its construction. The slide with its appropriate tool is turned in by hand, using the cross feed until the stop screw strikes the stop. This indicates that the proper diameter has been reached. The automatic transverse feed is then applied and the tool is fed up to a shoulder with the exact diameter desired.

The arrangement is simple, compact thoroughly protected and readily taken apart and put together.

I claim:

1. In a lathe the combination of a lathe turret having a horizontally disposed spur gear at the base thereof, a slide, a horizontally disposed stop cylinder journaled in the slide adjacent to the base of the turret, a pinion journaled in the slide in engagement with said gear, a pair of beveled gears in engagement with each other, one being connected with said pinion and the other being secured to and surrounding said stop cylinder and stop screws carried by said stop cylinder.

2. In a lathe, the combination of a lathe turret having a horizontally disposed spur gear at the base thereof, a slide, a horizontally disposed stop cylinder journaled in the slide, a pinion journaled in the slide vertically above said stop cylinder and in engagement with said gear, a pair of beveled gears in engagement with each other, one being connected with the under side of said pinion and the other being secured to and surrounding said stop cylinder and stop screws carried by said stop cylinder.

3. In a lathe, the combination of a lathe turret having a horizontally disposed spur gear at the base thereof, a slide, a horizontally disposed stop cylinder journaled in the slide, a pinion journaled in the slide adjacent to the base of the turret, a collar on one end of said stop cylinder and a nut on the opposite end for retaining the same in place, a pinion journaled in the slide vertically above the stop cylinder and in engagement with said gear, a pair of beveled gears in engagement with each other, one being on the under side of said pinion and formed integral therewith and the other being secured to and surrounding said stop cylinder and stop screws carried by said stop cylinder.

In testimony whereof I have affixed my signature, in presence of two witnesses.

WINTHROP LINCOLN FAY.

Witnesses:
F. D. DEARTH,
STANLEY WEYMOUTH.

Copies of this patent may be obtained for five cents each, by addressing the "Commissioner of Patents, Washington, D. C."